United States Patent [19]
Gnatowski et al.

[11] Patent Number: 5,693,409
[45] Date of Patent: Dec. 2, 1997

[54] TRIM BOARD

[75] Inventors: Marek Jan Gnatowski, Coquitlam; Kenneth Kwok-Cheung Lau, Vancouver; Douglas Elliot Rogerson, Richmond, all of Canada

[73] Assignee: MacMillan Bloedel Limited, Vancouver, Canada

[21] Appl. No.: 743,956

[22] Filed: Oct. 22, 1996

[51] Int. Cl.⁶ ............................................. B32B 9/00
[52] U.S. Cl. .................... 428/212; 428/107; 428/109; 428/110; 428/111; 428/113; 428/114; 428/218; 428/219; 428/246; 428/248; 428/249; 428/537.1; 156/264; 156/296; 52/309.9; 52/309.11; 52/729.4
[58] Field of Search ............................ 428/107, 114, 428/108, 109, 111, 212, 218, 248, 113, 215, 246, 249, 302, 317.1, 537.1, 219, 220, 105; 156/264, 296; 52/309.11, 309.9, 729.4

[56] References Cited

U.S. PATENT DOCUMENTS 2,697,677  12/1954  Elmendorf ........................ 154/45.9
3,164,511  1/1965   Elmendorf ........................ 161/57
5,196,061  3/1993   Thomas .

OTHER PUBLICATIONS

Fissette, P., "Exterior Trim Alternatives to Wood", JLC, May 1996, pp. 36–40.

*Primary Examiner*—Patrick Ryan
*Assistant Examiner*—Abraham Bahta
*Attorney, Agent, or Firm*—C. A. Rowley

[57] ABSTRACT

A fiber-cement trim board is formed by a fiber-cement core layer faced with a pair of fiber-cement surface layers of substantially equal thickness in the core layer and have a cement-to-wood ratio by weight of between 2 and 3.5 and at least 70% of the wood strands have a length longer than 10 min. Each of the surface layers is formed of a fiber-cement mixture containing wood strands, at least 80% of which have a length of less than 4 mm and a cement-to-wood ratio by weight of between 2 and 3.5. The board is covered at least on the two main faces by a water barrier coating.

8 Claims, 3 Drawing Sheets

TRIM BOARD

FIELD OF INVENTION

The present invention relates to a fiber-cement trim board, more particularly, the present invention relates to a three layer fiber-cement board having improved characteristics to make it suitable for use as trim board.

BACKGROUND OF THE INVENTION

Fiber-cement boards including fiber-cement trim boards are used as alternatives to solid wood in the housing industry. The two major players in the industry in the United States are James Hardie Building Products of Fontana, Calif. and ETERNIT of Blandon, Pa. Generally, these products are relatively low in fiber content (under about 10%).

James Hardie recently introduced a product known by the trademark "HardiTrim" for use as a trim board. These fiber-cement products generally have a high density in the order of about 80 lb/ft$^3$, 1300 kg/m$^3$ and are relatively hard requiring special equipment such as carbide tip blades for cutting. The currently available fiber-cement products may be nailed without predrilling, however, nailing is difficult (see the article "Exterior Trim Alternatives to Wood" by Paul Fisette, JLC May 1996, pages 36–40).

U.S. Pat. No. 3,164,511 issued Jan. 5, 1965 to Elmendorf discloses a fiber-cement product made from wood strands and cement with the wood strands oriented predominantly with their longitudinal axis parallel and substantially parallel to the longitudinal axis of the panel produced. Elmendorf shows that a strong product having a Modulus of Elasticity (MOE) substantially equivalent to that of plywood (over 700,000 psi (4830 N/mm$^2$) may be manufactured using Douglas fir veneer strands less than about 15 cm long and Portland cement.

U.S. Pat. No. 5,196,061 issued Mar. 23, 1993 to Thomas describes a cement composite product made from delignified cellulose debris.

BRIEF DESCRIPTION OF THE PRESENT INVENTION

It is an object of the present invention to provide a fiber-cement board having physical characteristics suited for use as a trim board.

Broadly, the present invention relates to a wood strand cement composite trim board having the length measured in the longitudinal direction of said board of at least 2 m, width of between 10 cm and 50 cm and thickness of between 20 and 30 mm, and comprising a wood strand-cement core layer faced on each side by a wood strand-cement surface layer, said surface layers being of substantially equal thickness, said core layer forming at least 75% of the thickness of said trim board and containing cement and wood strands in the ratio of between 2 and 3.5 parts by weight of cement to 1 part by weight of wood, at least 70% of said wood strands in said core having a length longer than 10 mm and said core being substantially free of strands having a length greater than 50 mm and each of said surface layers having a cement to wood ratio in the range of 2 to 3.5 parts cement to 1 part wood by weight, at least 80% of said wood strands in said surface layers having a length no greater than 4 mm in length and a water vapor barrier coating coating said board.

Preferably, said cement to wood ratio in said core and said surface layers is between 2.5 and 3.

Preferably, said trim board has a Modulus of Rupture (MOR) of between 8 N/mm$^2$ (1200 psi) and 12.5 N/mm$^2$ (1800 psi) and specific gravity oven dry basis (SG) in the range of 1.1 to 1.25 tested at a moisture content of 9%.

Preferably, said trim board has a Nailability Index (NI) of between 0.001 and 0.003 m$^3$/N, where NI=Fracture Toughness (FT)/(MOR×MOE×SG).

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

The trim board 10 of the present invention has a length L, width W and a thickness T and is formed with a core layer 12 and a pair of surface layers 14 and 16. The core layer has a thickness $t_c$ and the surface layers 14 and 16 each have the thickness $t_s$.

It has been found that the thickness of the core layer must be maximized to produce a trim board having the required characteristics including MOR, MOE and nailability, yet surface layers must be provided to obtain the required surface finish to the product. It has been found that the core thickness $t_c$ must be at least 0.75 T and preferably will be equal to at least 0.8 T while the surface layers will each have a minimum thickness ts of no less than about 0.08 T. In a preferred structure made in accordance with the present invention, the core had a thickness tc equal to 0.82 T and the surface layers 14 and 16 each had a thickness of 0.09 T.

The board is preferably formed using the well known Bison™ process for producing fiber-cement panels. The strand may be oriented in any desired manner from random to oriented substantially parallel to the longitudinal axis of the trim board.

It is important that the core layer be formed with long strands at least 70% of which will have a length longer than 10 mm while the surface layers will be composed of short strands at least 80% of which have a length less than 4 mm.

To maintain the required characteristics of the final product, it is also important that the ratio of cement to wood be within the range of between 2 to 3.5 kg of cement per kg of wood both in core and in the surface layers. Preferably, this ratio will be within the range of 2.5 to 3 kg cement per kg of wood strands. Outside of these ranges, the density becomes either too high or too low and the nailability of the product is unsatisfactory.

Generally, the specific gravity of the product will be in the order of about 1.1 to 1.25.

The product is formed by first laying a surface layer followed by a core layer followed by a second surface layer, pressing the layers using the conventional Bison™ dry technique and then pressing and setting the cement to produce the product. The product will normally be formed as a panel and then cut into strips to form the trim board having width generally between about 10 and 50 cm and lengths in the order of greater than 2 m and generally less than about 6 m. The thickness of the product T will normally be in the range of about 2 to 3.5 cm, preferably, at least 2.5 cm. The length to thickness ratio of the trim board created handling problems, specifically breakage, if one attempted to provide a trim board using the conventional Bison™ process and formulation as known in the art.

Figure 1:
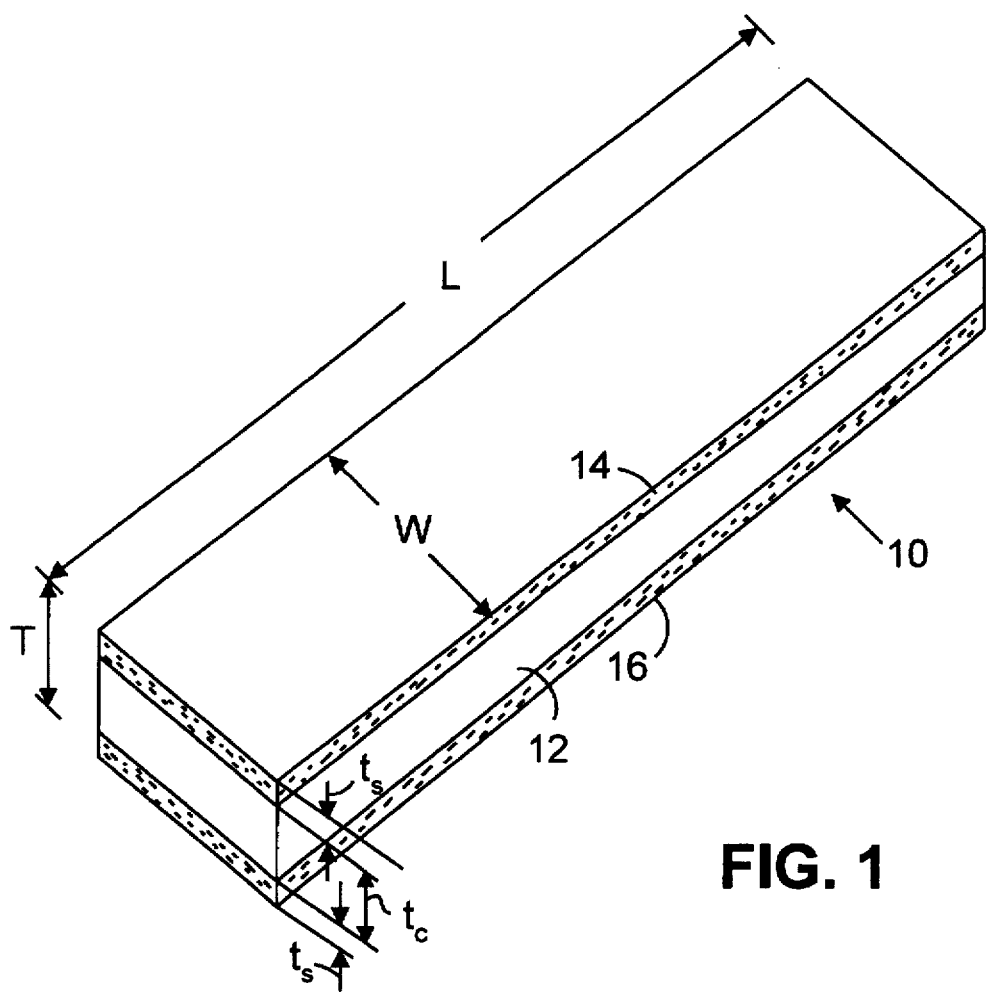
FIG. 1 is an isometric view showing a cross-section through a trim board constructed in accordance with the present invention.
Figure 2:
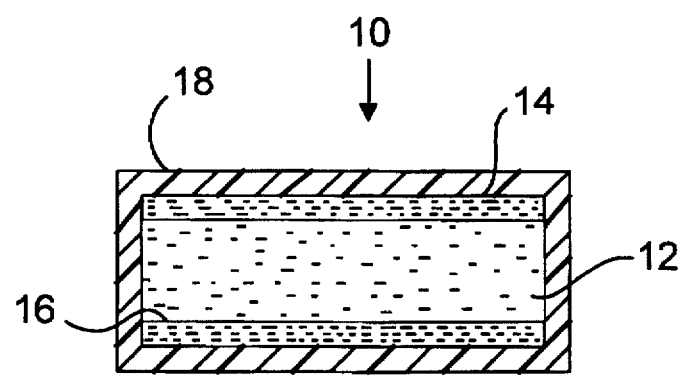
FIG. 2 is a section cross of a coated finish trim board.

After the panel has been formed and cut as above described, it is then coated with a water vapor barrier coating to form a coated surface on all sides of the board as indicated by the coating 18 shown in FIG. 2. This coating may be any suitable water vapor barrier type polymer that will adhere to the board and preferably is subsequently paintable. The preferred polymer used with the present invention is a modified styrene butadiene latex.

The vapor barrier coating 18 as above indicated, may be any suitable vapor barrier coating compatible with the cement used to form the panel. It has been found an alkali resistance Dow Chemical Co. formulation using Dow's modified styrene butadiene latex (DL313NL) was satisfactory and provided a moisture vapor permeability of less than one perm obtained using a relatively thin film thickness of 0.05 mm.

Figure 3:
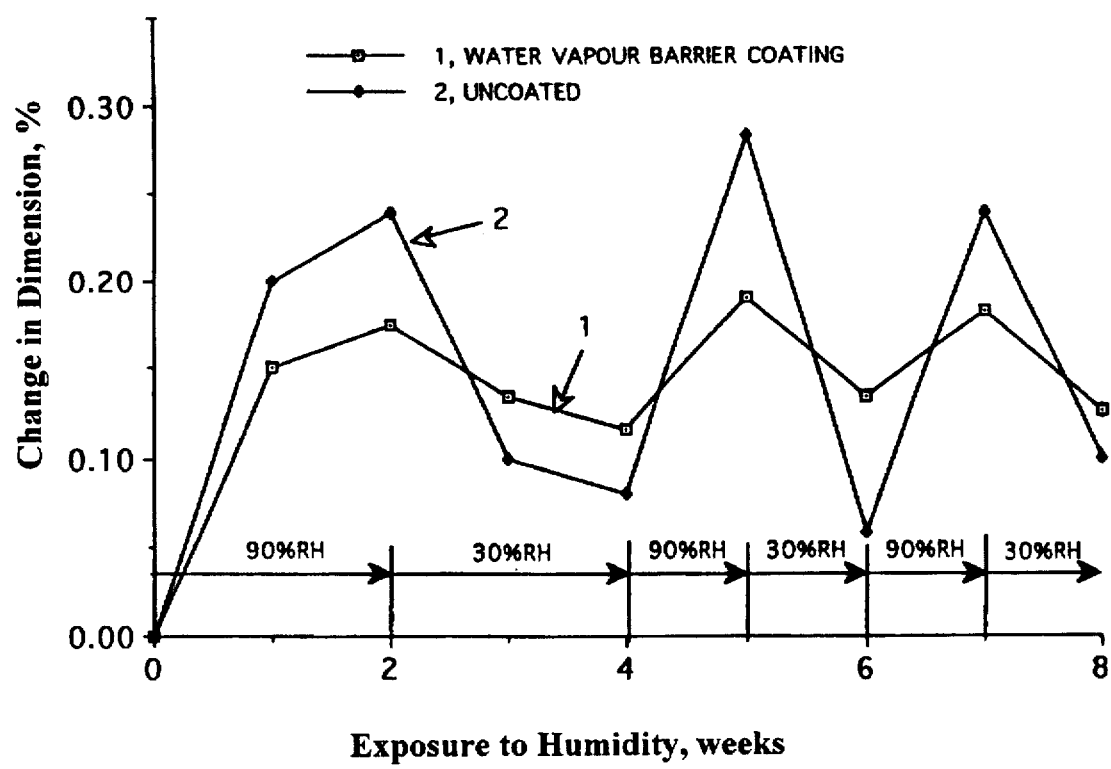
FIG. 3 is a plot of change in relative humidity R.H.; change in dimension of a board used with the present invention (1); and an uncoated or unprotected board (2), all versus time.

Referring to FIG. 3, it can be seen that the protected board using this Dow formulation to specification of a water permeability of one perm that the barrier coated panels have significantly less dimensional than the uncoated board. It can be seen that as the relative humidity was cycled between 90 and 30%, the uncoated board changed dimensionally by about 0.2% while the coated board changed by about 0.05%.

Figure 4:
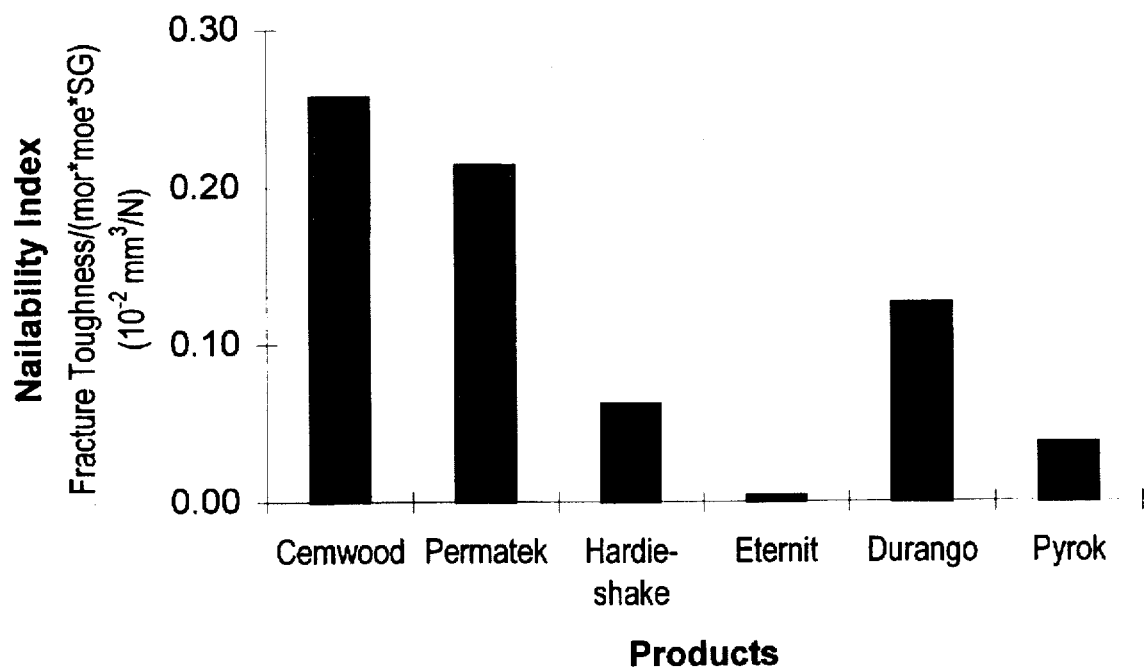
FIG. 4 is a bar graph showing the Nailability Index (NI) of various fiber-cement products.

As above indicated, the toughness to strength ratio which defines the nailability of the product is very important to the effectiveness of the product. FIG. 4 shows the plot of the Nailability Index (NI) calculated as Fracture Toughness (FT)/(MOR×MOE ×SG) in m$^3$/N for different commercially available products as well as the present invention.

i.e. NI=FT/(MOR×MOE×SG) in m$^3$/N

The term "Fracture Toughness" as used herein means energy to break in flexure test (the area under load versus deflection plot) divided by cross-section area of break for the sample measured as kJ/m$^2$. Fracture Toughness can be compared in these units between equal thickness products, however, for significantly different thicknesses, direct comparisons may not be accurate. Fracture Toughness thus provides a reasonable (but not absolute) comparison if the thicknesses tested do not differ significantly (see "Refined Wood Fiber-Cement Products" by Coutts and Ridikas, March 1982).

It will be noted that the Cemwood and Permatek products have significantly higher nailability indexes and the Hardishake, Eternit and Pyrok products have significantly lower nailability indexes. The Nailability Index (NI) for effective use as a trim board should be in the range of about 0.001 to about 0.003 m$^3$/N and it will be apparent that only the present invention falls within this range.

EXAMPLE

Figure 5:
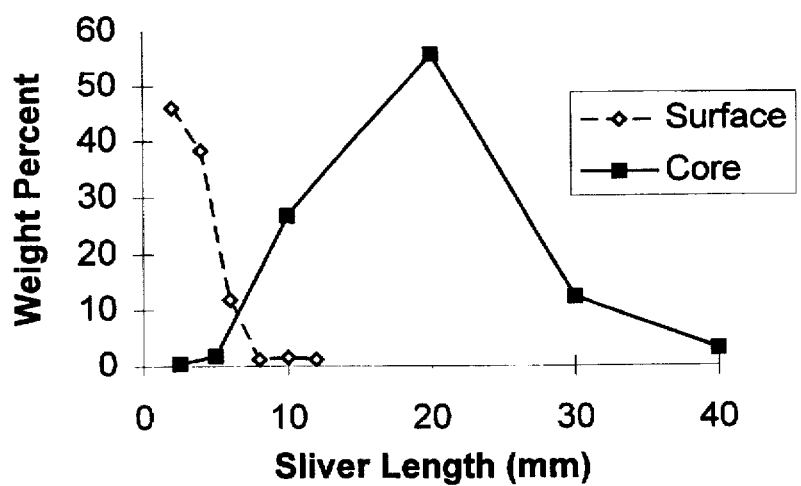
FIG. 5 is a plot of sliver or strand length (mm) to weight percent of the wood slivers in the core and surface layers.

In a particular test of the present invention, the fiber-cement mixture contained 3.7% waterglass (sodium silicate based on cement solids). The core and surface layers had sliver lengths as shown in FIG. 5 and were tested separately to determine the contributions of the core and surface layers to the overall characteristics of the board. It was generally found that after 21 days curing time, the core had a Fractured Toughness in kJ/m$^2$ of 30 whereas the surface layers were significantly less strong and had a Fractured Toughness about half of that of the core, i.e. in the order of about 17 kJ/m$^2$. The core had an MOR of 9N/mm$^2$ (1400 psi) while the surface layers had an MOR of about 7.5N/mm$^2$ (1100 psi).

It has been found to be important that the waterglass solids of the fiber-cement mix be in the range of about 3 to 4.5% of cement solids to obtain optimum strength characteristics of the end product.

The strengths reported above are lab determined and have been found to be slightly higher than those obtained in the mill by as much as 2N/mm$^2$.

Having described the invention, modifications will be evident to those skilled in the art without departing from the scope of the invention as defined in the appended claims.

We claim:

1. A wood strand cement composite trim board having the length measured in the longitudinal direction of said board of at least 2 m, width of between 10 cm and 50 cm and thickness of between 20 and 30 mm, and comprising a wood strand-cement core layer faced on each side by a wood strand-cement surface layer, said surface layers being of substantially equal thickness, said core layer forming at least 75% of the thickness of said trim board and containing cement and wood strands in the ratio of between 2 and 3.5 parts by weight of cement to 1 part by weight of wood, at least 70% of said wood strands in said core having a length longer than 10 mm and no longer than 50 mm and each of said surface layers having a thickness of at least 8% of said thickness of said trim board and having a cement to wood ratio in the range of 2 to 3.5 parts cement by weight to 1 part wood by weight, at least 80% of said wood strands in said surface layers having a length no greater than 4 mm in length and a water vapor barrier coating coating said board.

2. A wood strand cement composite trim board as defined in claim 1 wherein said cement to wood ratio in said core and said surface layers is between 2.5 and 3.

3. A wood strand cement composite trim board as defined in claim 1 wherein said trim board has a MOR of between 8N/mm$^2$ and 12.5N/mm$^2$ tested at a moisture content of 9% and SG in the range of 1.1 to 1.25.

4. A wood strand cement composite trim board as defined in claim 2 wherein said trim board has a MOR of between 8N/mm$^2$ and 12.5N/mm$^2$ tested at a moisture content of 9% and SG in the range of 1.1 to 1.25.

5. A wood strand cement composite trim board as defined in claim 1 wherein said trim board has a Nailability Index (NI) of between 0.001 and 0.003 m$^3$/N.

6. A wood strand cement composite trim board as defined in claim 2 wherein said trim board has a Nailability Index (NI) of between 0.001 and 0.003 m$^3$/N.

7. A wood strand cement composite trim board as defined in claim 3 wherein said trim board has a Nailability Index (NI) of between 0.001 and 0.003 m$^3$/N.

8. A wood strand cement composite trim board as defined in claim 4 wherein said trim board has a Nailability Index (NI) of between 0.001 and 0.003 m$^3$/N.

* * * * *